United States Patent
Hatano et al.

(10) Patent No.: US 9,760,460 B2
(45) Date of Patent: Sep. 12, 2017

(54) STORAGE SYSTEM, STORAGE DEVICE, AND MONITORING SERVER

(71) Applicant: FUJITSU LIMITED, Kawasaki-shi, Kanagawa (JP)

(72) Inventors: Hidemasa Hatano, Susono (JP); Minoru Maeda, Nagoya (JP); Naoto Takeishi, Numazu (JP); Kazuyoshi Watanabe, Tagata (JP); Takashi Kawada, Yokohama (JP); Shinichi Nishizono, Kawasaki (JP); Akihiro Ueda, Kawasaki (JP); Kenji Hattori, Odawara (JP); Atsushi Takakura, Kawasaki (JP); Atsushi Katano, Adachi (JP)

(73) Assignee: FUJITSU LIMITED, Kawasaki (JP)

( * ) Notice: Subject to any disclaimer, the term of this patent is extended or adjusted under 35 U.S.C. 154(b) by 129 days.

(21) Appl. No.: 14/630,773

(22) Filed: Feb. 25, 2015

(65) Prior Publication Data
US 2015/0278052 A1  Oct. 1, 2015

(30) Foreign Application Priority Data
Mar. 31, 2014 (JP) ................................ 2014-074565

(51) Int. Cl.
*G06F 11/00* (2006.01)
*G06F 11/20* (2006.01)
(Continued)

(52) U.S. Cl.
CPC ...... *G06F 11/2094* (2013.01); *G06F 11/3034* (2013.01); *G06F 11/3048* (2013.01);
(Continued)

(58) Field of Classification Search
USPC .......................................................... 714/6.3
See application file for complete search history.

(56) References Cited

U.S. PATENT DOCUMENTS 5,574,863 A * 11/1996 Nelson .................. G06F 3/0601
707/999.001
5,926,367 A * 7/1999 Gutierrez ................ G06F 1/189
361/695
(Continued)

FOREIGN PATENT DOCUMENTS

CN        103677967      3/2014
JP        2004-532442    10/2004
(Continued)

OTHER PUBLICATIONS

Extended European Search Report dated Nov. 16, 2015 in corresponding European Patent Application No. 15156569.4.
(Continued)

*Primary Examiner* — Amine Riad
(74) *Attorney, Agent, or Firm* — Staas & Halsey LLP

(57) ABSTRACT

A monitoring server includes a transmission and reception unit that receives information from a first storage device and a second storage device by performing polling to the first storage device and the second storage device at a certain interval, and transmits the received information to the first storage device and the second storage device at next polling. The first storage device and the second storage device includes a failover processing unit that inactivates a communication port when the failover processing unit determines that abnormality has occurred in a communication path between the first storage device and the second storage device and determines, based on the polling from the monitoring server, that abnormality has occurred in a communication path between the storage device and the monitoring server.

9 Claims, 23 Drawing Sheets

(51) Int. Cl.
  *H04L 12/26* (2006.01)
  *H04L 29/08* (2006.01)
  *G06F 11/30* (2006.01)

(52) U.S. Cl.
  CPC ...... *G06F 11/3055* (2013.01); *G06F 11/3065* (2013.01); *H04L 43/0823* (2013.01); *H04L 67/1097* (2013.01)

(56) References Cited

U.S. PATENT DOCUMENTS

| | | | | |
|---|---|---|---|---|
| 6,961,867 B2* | 11/2005 | Goodman | ........... | G06F 11/2094 714/13 |
| 6,980,510 B1* | 12/2005 | Deitz | ........... | H04L 12/437 370/217 |
| 7,500,134 B2* | 3/2009 | Madnani | ........... | G06F 3/0617 714/6.2 |
| 7,529,180 B1* | 5/2009 | Karl | ........... | H04L 45/02 370/216 |
| 7,779,137 B1* | 8/2010 | Bali | ........... | G06F 11/201 709/200 |
| 7,881,185 B1* | 2/2011 | Karl | ........... | H04L 45/02 370/216 |
| 2002/0188711 A1* | 12/2002 | Meyer | ........... | G06F 3/0605 709/223 |
| 2003/0172331 A1* | 9/2003 | Cherian | ........... | G06F 11/2092 714/712 |
| 2003/0208703 A1 | 11/2003 | Goodman et al. | | |
| 2005/0246568 A1* | 11/2005 | Davies | ........... | G06F 11/0709 714/2 |
| 2006/0117212 A1 | 6/2006 | Meyer et al. | | |
| 2007/0070975 A1* | 3/2007 | Otani | ........... | G06F 11/2007 370/351 |
| 2008/0215910 A1* | 9/2008 | Gabriel | ........... | H04L 12/4641 714/4.1 |
| 2012/0039165 A1* | 2/2012 | Brown | ........... | G06F 11/2017 370/220 |

FOREIGN PATENT DOCUMENTS

| | | |
|---|---|---|
| JP | 2010-067115 | 3/2010 |
| WO | 99/34291 | 7/1999 |
| WO | WO 02/065298 A1 | 8/2002 |

OTHER PUBLICATIONS

Partial European Search Report, dated Sep. 10, 2015, in corresponding European Application No. 15156569.4 (6 pp.).

* cited by examiner

FIG.4

| IO INHIBITION STATE | NOT IN INHIBITION STATE/ IN INHIBITION STATE |
|---|---|
| TFO Group Condition | Normal/Halt |
| TFO Group Status | Active/Standby |
| TFO Group Condition Halt Factor | None/ TFO Group Disconnected/ Monitoring Server Disconnected |
| Kind | Primary/Secondary/None |
| Pair Box ID | XXXXXXXXXX |
| Pair Port Count | 2 |
| WWNN | yyyyyyyyyyyy |
| Own Port [0] | CM#0CA#0Port#0 |
| Pair Port [0] | CM#0CA#0Port#0 |
| WWPN [0] | zzzzzzzz |
| Own Port [1] | CM#1CA#1Port#2 |
| Pair Port [1] | CM#1CA#1Port#2 |
| WWPN [1] | pppppppppp |

| CM#0CA#0Port#0 | TFO Group#0 |
|---|---|
| CM#0CA#0Port#1 | None |
| CM#0CA#0Port#2 | None |
| ⋮ | ⋮ |

| OLU#0 TFO Group Num | TFO Group#0 |
|---|---|
| OLU#1 TFO Group Num | None |
| OLU#2 TFO Group Num | None |
| ⋮ | ⋮ |

FIG.7

| TFO SESSION STATUS | Copying/ Active/ Suspend |
|---|---|
| COPY-SOURCE OLU | OLU#0 |
| COPY-DESTINATION OLU | OLU#0 |

T4

STORAGE SYSTEM, STORAGE DEVICE, AND MONITORING SERVER

CROSS-REFERENCE TO RELATED APPLICATION(S)

This application is based upon and claims the benefit of priority of the prior Japanese Patent Application No. 2014-074565, filed on Mar. 31, 2014, the entire contents of which are incorporated herein by reference.

FIELD

The embodiment discussed herein is related to a storage system, a storage device, and a monitoring server.

BACKGROUND

Some storage systems that manage data of host servers such as business servers include an active storage unit and a standby storage unit in case of the failure of storage, for example. The storage systems make backup copies of data of the active storage unit and store them in the standby storage unit. When it is difficult for data to be input or output between a host server and the active storage unit, a system administrator checks the status of both active and standby storage units and performs failover processing by which the active storage unit is switched to the standby storage unit.

However, conventional techniques, such as Japanese National Publication of International Patent Application No. 2004-532442 and Japanese Laid-open Patent Publication No. 2010-067115, require processes such as checking and setting of the storage units by the system administrator before the system administrator performs the failover processing by which the active storage unit is switched to the standby storage unit. Consequently, a (business suspension) period occurs in some cases in which it is difficult for the host server to continue input or output of data to or from the storage unit.

SUMMARY

According to an aspect of an embodiment, a storage system includes: a first storage device that includes an active storage unit and a communication port communicating with a host server; a second storage device that includes a standby storage unit and a communication port communicating with the host server; and a monitoring server, the first storage device, the second storage device, and the monitoring server being communicably connected with each other, the communication port of the first storage device and the communication port of the second storage device having a same identifier, the host server communicating with, based on the identifier, one of the first storage device and the second storage device with the communication port being activated, wherein the monitoring server includes a transmission and reception unit that receives information from the first storage device and the second storage device by performing polling to the first storage device and the second storage device at a certain interval, and transmits the received information to the first storage device and the second storage device at next polling, the first storage device includes a first failover processing unit that inactivates the communication port of the first storage device when the first failover processing unit determines that abnormality has occurred in a communication path between the first storage device and the second storage device and determines, based on the polling from the monitoring server, that abnormality has occurred in a communication path between the first storage device and the monitoring server, and the second storage device includes a second failover processing unit that activates the communication port of the second storage device when the second failover processing unit determines that abnormality has occurred in the communication path between the first storage device and the second storage device and determines, based on the polling from the monitoring server, that abnormality has occurred in the communication path between the first storage device and the monitoring server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating management information;

FIG. 5 is a diagram illustrating a port management table;

FIG. 6 is a diagram illustrating an open logical unit (OLU) management table;

FIG. 7 is a diagram illustrating a session management table;

DESCRIPTION OF EMBODIMENT

Preferred embodiments of the present invention will be explained with reference to accompanying drawings. In the embodiment, the same signs are given to configurations having the same functions, and duplicate description thereof is omitted. The storage system, the storage device, and the monitoring server described in the following embodiment are presented for the illustrative purpose only, and are not intended to limit the embodiment. Aspects of the following embodiment may be combined unless otherwise conflicting with each other.

Figure 1:
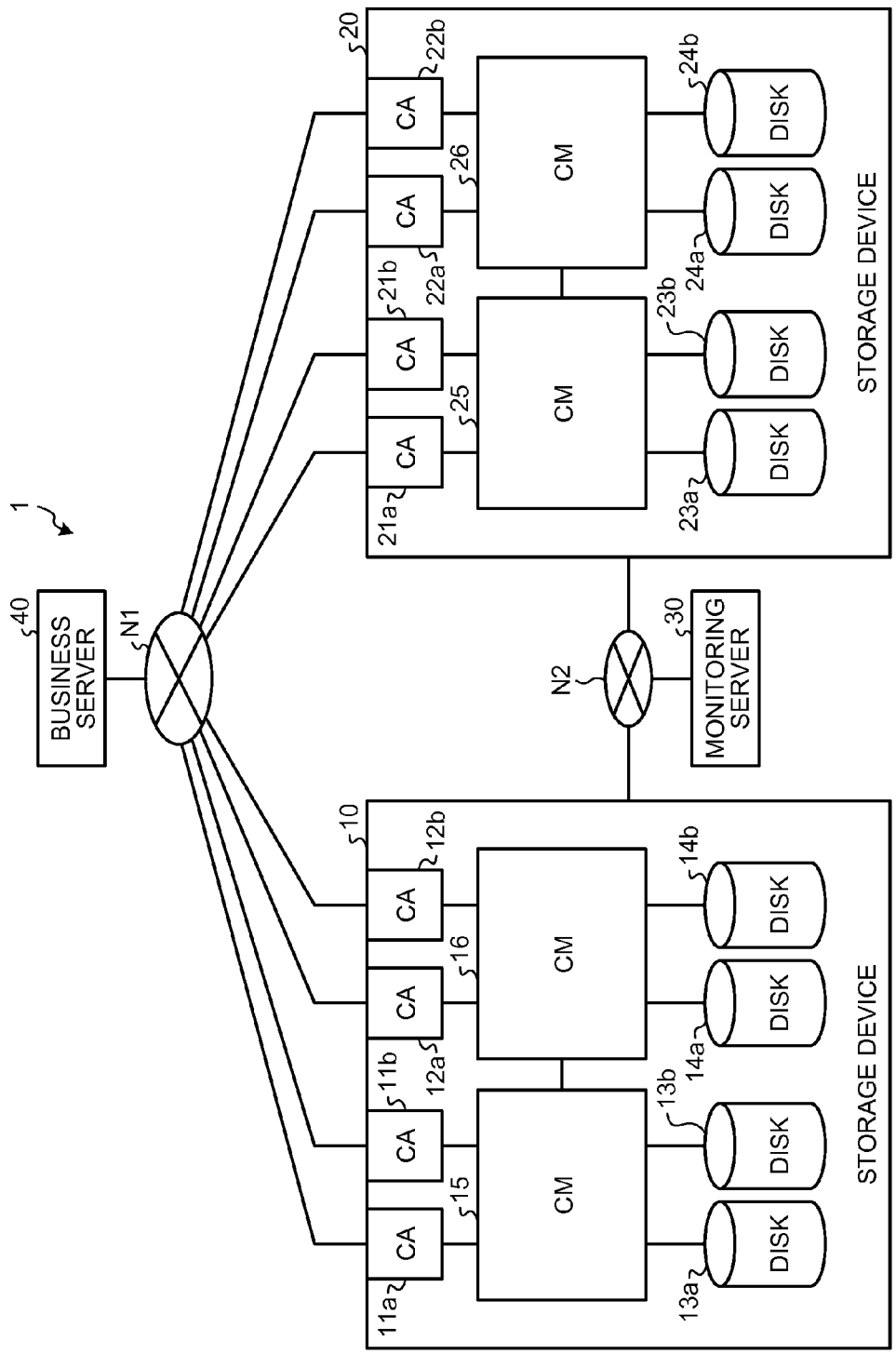
FIG. 1 is a block diagram illustrating a configuration of a storage system according to an embodiment.

FIG. 1 is a block diagram illustrating a configuration of a storage system 1 according to the embodiment. As illustrated in FIG. 1, the storage system 1 includes storage devices 10 and 20, a monitoring server 30, and a business server 40. The storage devices 10 and 20 and the business server 40 are in communication with each other via a network N1 such as a storage area network (SAN). The storage devices 10 and 20 and the monitoring server 30 are in communication with each other via a network N2 such as a local area network (LAN). The monitoring server 30 monitors the storage devices 10 and 20 via the network N2 (details will be described later). The business server 40 is a host server that uses the storage devices 10 and 20 via the network N1.

The storage devices 10 and 20 manage data that the business server 40 inputs and outputs via the network N1 by storing it into disks 13a, 13b, 14a, 14b, 23a, 23b, 24a, and 24b. Specifically, the disks 13a, 13b, 14a, 14b, 23a, 23b, 24a, and 24b are divided into two and assigned as active storage units and standby storage units. The storage system 1 manages active storage units and standby storage units as one group.

The active storage units are what is called primary storage and are used, for example, in a normal operation when no failure occurs in the active storage units. The standby storage units are what is called secondary storage and store therein a copy of the active storage units in, for example, the normal operation. When a failure occurs to the active storage units, the standby storage units are used after failover processing is performed by which the active storage units are switched to the standby storage units.

Combinations of active storage units and standby storage units are determined as appropriate by the system administrator of the storage system 1. For example, the system administrator may set the disks 13a, 13b, 14a, and 14b of the storage device 10 as the primary storage and the disks 23a, 23b, 24a, and 24b of the storage device 20 as the secondary storage. In this case, the storage device 10 includes the active storage units and the storage device 20 includes the standby storage units. In the present embodiment, the combination of active storage units and standby storage units is referred to as a transparent failover (TFO) group. The transparent failover is failover that switches the active storage units to the standby storage units transparently without being recognized by the business server 40.

Figure 2:
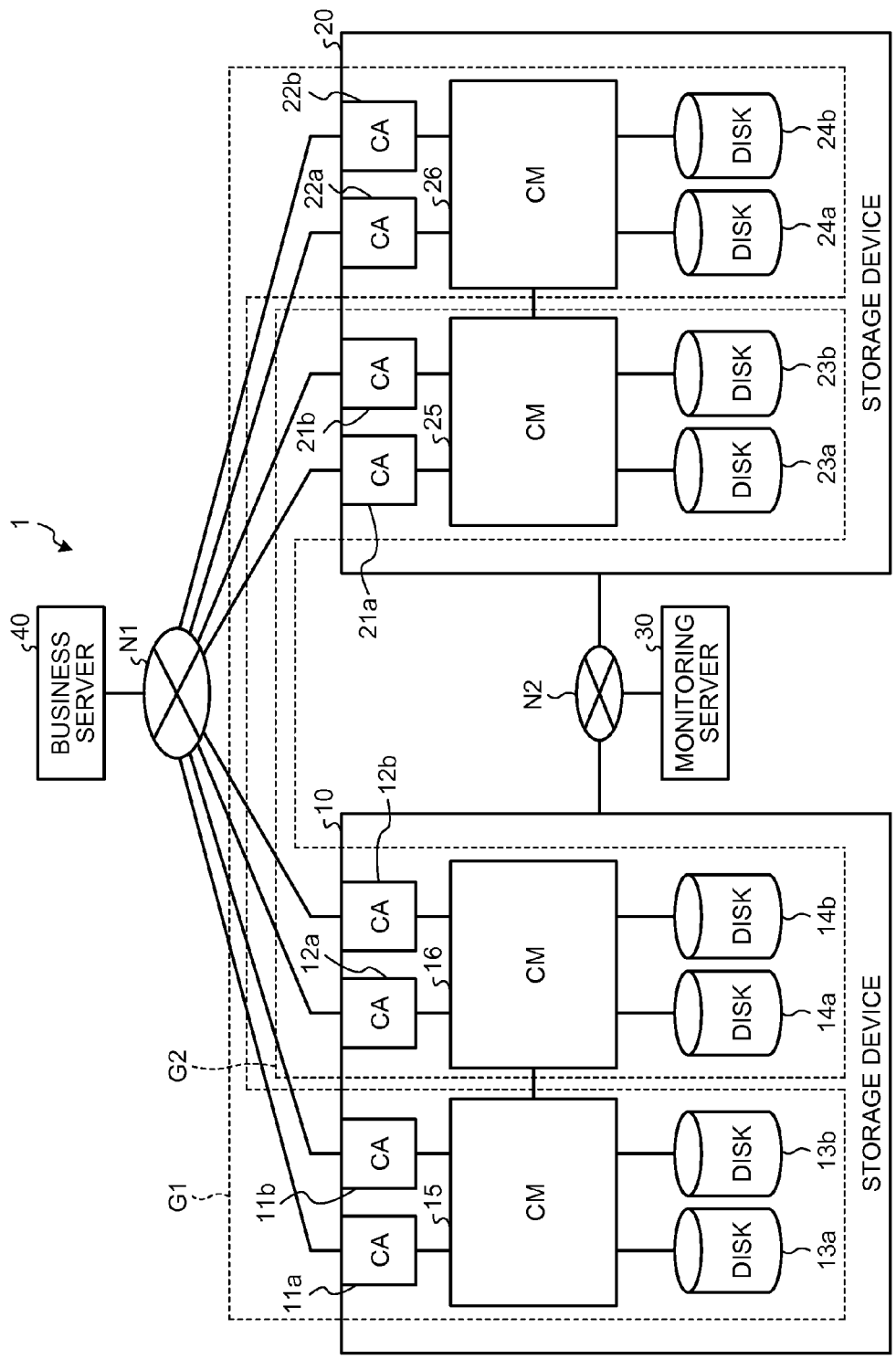
FIG. 2 is a diagram illustrating transparent failover (TFO) groups.

The TFO group may be any combination of active storage units and standby storage units. FIG. 2 is a diagram illustrating TFO groups. As illustrated in FIG. 2, for example, a plurality of TFO groups may be set such as TFO groups G1 and G2. The TFO group G1 may include the disks 13a and 13b of the storage device 10 as the primary storage, and the disks 24a and 24b of the storage device 20 as the secondary storage. The TFO group G2 may include the disks 23a and 23b of the storage device 20 as the primary storage, and the disks 14a and 14b of the storage device 10 as the secondary storage. In this case, the storage device 10 includes the active storage units of the TFO group G1 and the storage device 20 includes the standby storage units of the TFO group G1. As for the TFO group G2, the storage device 10 includes the standby storage units of the TFO group G2, and the storage device 20 includes the active storage units of the TFO group G2, which is the reverse configuration of the TFO group G1.

In the embodiment described below, assume that the storage device 10 is the primary storage that includes active storage units, and the storage device 20 is the secondary storage that includes standby storage units.

The storage device 10 includes channel adapters (CAs) 11a, 11b, 12a, and 12b, the disks 13a, 13b, 14a, and 14b, and control modules (CMs) 15 and 16. The CAs 11a, 11b, 12a, and 12b are interfaces (communication ports) that perform communication via the network N1. The disks 13a, 13b, 14a, and 14b are configured as, for example, redundant arrays of inexpensive disks (RAID) and store therein write data received from the business server 40.

The CMs 15 and 16 control input and output of data between the business server 40 and the disks 13a, 13b, 14a, and 14b and communication with the monitoring server 30. The CMs 15 and 16 may include a cache memory (not illustrated) for a logical volume that temporarily stores therein data read and written in response to a request from the business server 40. The CMs 15 and 16 may include a transfer buffer (not illustrated) that is used when the business server 40 requests the storage device 10 to transfer data to the storage device 20.

The storage device 20 includes CAs 21a, 21b, 22a, and 22b, the disks 23a, 23b, 24a, and 24b, and CMs 25 and 26. The CAs 21a, 21b, 22a, and 22b are interfaces (communication ports) that perform communication via the network N1. The disks 23a, 23b, 24a, and 24b are configured as, for example, RAID, and store therein write data received from the business server 40 and data transferred from the storage device 10.

The CMs 25 and 26 control input and output of data between the business server 40 and the disks 23a, 23b, 24a, and 24b, input and output of data transferred from the storage device 10, and communication with the monitoring server 30. The CMs 25 and 26 may include a cache memory (not illustrated) for a logical volume that temporarily stores therein data read and written in response to a request from the business server 40. The CMs 25 and 26 may include a transfer buffer (not illustrated) that is used when the storage device 20 receives data from the storage device 10.

A certain world wide name (WWN) is set in the CAs 11a, 11b, 12a, 12b, 21a, 21b, 22a, and 22b that are the communication ports of the storage devices 10 and 20 for communicating with the business server 40 via the network N1. The WWN is an identifier uniquely set for identifying a device in a SAN. When, for example, a LAN is used instead of a SAN, an internet protocol (IP) address may be used as the identifier.

In the present embodiment, the CAs 11a, 11b, 12a, and 12b of the storage device 10 that communicate with the business server 40 each have, for example, a world wide port name (WWPN) that is an identifier of each port, and a world wide node name (WWNN) that is an identifier of the same node (the storage device 10).

The CAs 21a, 21b, 22a, and 22b of the storage device 20 that communicate with the business server 40 have the same WWPNs as those of the CAs 11a, 11b, 12a, and 12b, respectively, and each have the same WWNN as that of the storage device 10.

In other words, the storage device 10 as the primary storage and the storage device 20 as the secondary storage have the same WWPNs and WWNN so that the operation will be smoothly continued without causing any input/output errors when the storage devices 10 and 20 are switched. In the same manner, for example, the same universal IDs (UIDs) of volumes and the same host logical unit number (HLUN) are set for the storage devices 10 and 20.

The communication ports of one of the storage devices 10 and 20 are linked up (activated) and the communication ports of the other one are linked down (inactivated). By this operation, the business server 40 can communicate with one of the storage devices 10 and 20 whose communication ports are linked up. For example, in a normal operation in which no failure occurs in the storage functionality of the storage device 10, the communication ports of the storage device 10 are linked up, and the communication ports of the storage device 20 are linked down. With this configuration, the business server 40 uses the storage device 10 for inputting and outputting data in a normal operation. When any failure occurs in the storage functionality of the storage device 10, the communication ports of the storage device 10 are linked down, and the communication ports of the storage device 20 are linked up. By this operation, the storage device 10 is switched to the storage device 20 transparently, so that the business server 40 inputs and output data to and from the storage device 20.

The monitoring server 30 polls the storage devices 10 and 20 via the network N2 at certain intervals to receive various kinds of information from the storage devices 10 and 20. The monitoring server 30 transmits information received at the polling to the storage devices 10 and 20 at the next polling. By this operation, the storage devices 10 and 20 share various kinds of information with each other. When a timeout occurs in polling the storage devices 10 and 20, the monitoring server 30 notifies the storage devices 10 and 20 of the timeout. This notification enables the storage devices 10 and 20 to recognize a failure occurring in communication paths between the monitoring server 30 and the storage devices 10 and 20.

Figure 3:
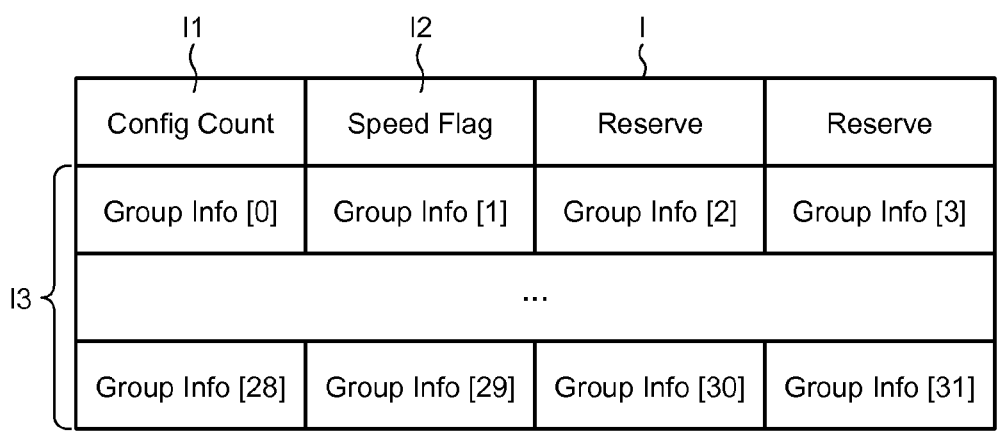
FIG. 3 is a diagram illustrating transmission and reception information.

Described next is transmission and reception information transmitted and received between the storage devices 10 and 20 by the polling from the monitoring server 30. FIG. 3 is a diagram illustrating transmission and reception information I.

As illustrated in FIG. 3, the transmission information I includes an area I1 in which "config count" is stored, an area I2 in which "speed flag" is stored, and an area I3 in which "group info[0]" to "group info[31]" are stored.

"Config count" is information indicating a change in a setting of the TFO group, that is, configuration of, for example, storage units of the storage devices 10 and 20. "config count" is, for example, a counter value that is incremented when the configuration is changed. For example, the storage devices 10 and 20 can find whether the configuration is changed by referring to "config count" stored in the area I1 of the transmission information I transmitted at the polling from the monitoring server 30 and by comparing the stored "config count" with the most recent "config count".

"Speed flag" indicates whether a polling interval is to be shortened. For example, when the "speed flag" is "normal", the monitoring server 30 keeps the polling interval as it is. When the "speed flag" is "high speed", the monitoring server 30 shortens the polling interval.

"Group info[0]" to "group info[31]" are information transmitted between storage devices in respective TFO groups (0 to 31) in response to the polling from the monitoring server 30. In the present embodiment, because the storage device 10 as the primary storage and the storage device 20 as the secondary storage constitute one TFO group, the storage devices 10 and 20 store information in, for example, "group info[0]" to notify each other of the information.

For example, the storage device 10 as the primary storage stores input and output (IO) inhibition notification indicating that the storage device 10 inhibits input and output of data to and from the business server 40 in "group info[0]" shared with the storage device 20 of the same TFO group to notify the storage device 20 of the IO inhibition notification. The storage device 20 as the secondary storage stores an IO inhibition response in response to the IO inhibition notification from the storage device 10 in "group info[0]" to notify the storage device 10 of the IO inhibition response. The monitoring server 30 stores, in "group info[0]", information of a timeout (failure) in polling the storage devices 10 and 20 to notify the storage devices 10 and 20 of the timeout. When there is any change in the configuration of the storage devices 10 and 20, the storage devices 10 and 20 store, in "group info[0]", information indicating that the configuration is being changed and information on the difference due to the change to notify each other.

The storage devices 10 and 20 store information such as the TFO group status and various settings based on the transmission information I received at the polling from the monitoring server 30 in, for example, a non-volatile memory (not illustrated) in the CMs 15, 16, 25, and 26 in a form of management information and a management table.

Described next is the management information and the management table stored in the storage devices 10 and 20. FIG. 4 is a diagram illustrating management information T1. As illustrated in FIG. 4, the management information T1 contains information on a TFO group. The management information T1 is provided for each TFO group (0 to 31). Various kinds of information relating to a certain TFO group can be checked by referring to the management information T1 on the TFO group.

Specifically, the management information T1 includes "IO inhibition status", "TFO group condition", "TFO group status", and "TFO group condition halt factor". "IO inhibition status" indicates whether the primary storage of a TFO group is inhibiting input and output (IO) of data to and from the business server 40. "TFO group condition" indicates whether the condition of the TFO group is normal or halt.

"TFO group status" indicates whether the status of the TFO group is active or standby. "TFO group condition halt factor" indicates what factor has caused the TFO group to be in a halt condition. Specifically, "TFO group condition halt factor" includes "none" indicating no factor, "TFO group disconnected" indicating disconnection of communication between the primary storage and the secondary storage, and "monitoring server disconnected" indicating disconnection of communication between the primary storage and the monitoring server.

The management information T1 also includes "kind", "pair box ID", "pair port count", and "WWNN". "Kind" indicates whether the storage device is the primary storage, the secondary storage, or none of the above. "Pair box ID" is an ID for identifying the pair storage device. "Pair port count" is a counter value indicating a change in configuration of the pair storage device. "WWNN" indicates the world wide node name of the storage device. The management information T1 also includes "own port[0] . . . ", "pair port[0] . . . ", and "WWPN[0] . . . " indicating settings of each communication port.

FIG. 5 is a diagram illustrating a port management table T2. As illustrated in FIG. 5, the port management table T2 is a table for managing the communication ports of the storage device. The storage device can check, for example, which TFO group uses which CA of the storage device by referring to the port management table T2.

FIG. 6 is a diagram illustrating an OLU management table T3. As illustrated in FIG. 6, the OLU management table T3 is a table for managing OLUs of the storage device. For example, the storage device can check which TFO group uses which OLU of the storage device by referring to the OLU management table T3.

FIG. 7 is a diagram illustrating a session management table T4. As illustrated in FIG. 7, the session management table T4 is a table for managing the session of a TFO group and includes "TFO session status", "copy-source OLU", and "copy-destination OLU". "TFO session status" indicates the current session status of the TFO group such as "copying", "active", or "suspend". "Copy-source OLU" and "copy-destination OLU" indicate, respectively, an OLU from which data is copied and an OLU to which data is copied in the TFO group.

Figure 8:
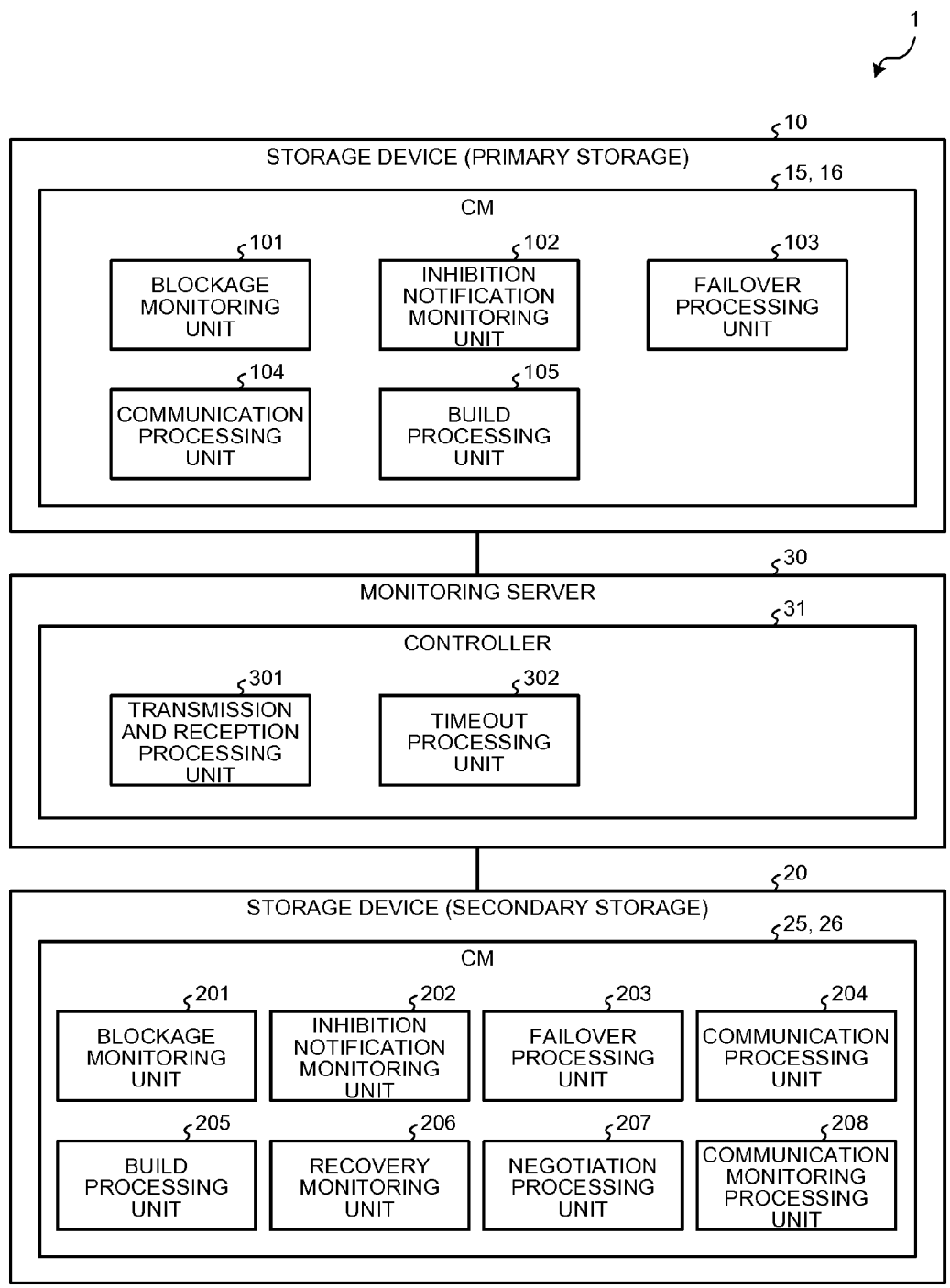
FIG. 8 is a block diagram illustrating a functional configuration of the storage system according to the embodiment.

Described next is a functional configuration of the storage system 1. FIG. 8 is a block diagram illustrating a functional configuration of the storage system 1 according to the embodiment. As illustrated in FIG. 8, the storage device 10 as the primary storage implements functions of a blockage monitoring unit 101, an inhibition notification monitoring unit 102, a failover processing unit 103, a communication processing unit 104, and a build processing unit 105 by sequentially running computer programs on the CMs 15 and 16. In the same manner, the storage device 20 as the secondary storage implements functions of a blockage monitoring unit 201, an inhibition notification monitoring unit 202, a failover processing unit 203, a communication processing unit 204, a build processing unit 205, a recovery monitoring unit 206, a negotiation processing unit 207, and a communication monitoring processing unit 208 by sequentially running computer programs on the CMs 25 and 26. In the monitoring server 30, a controller 31 implements functions of a transmission and reception processing unit 301 and a timeout processing unit 302. The controller 31 includes a central processing unit (CPU), a read only memory (ROM), and a random access memory (RAM), for example. The controller 31 provides the above described functional units by the CPU loading computer programs stored in, for example, the ROM on the RAM and sequentially running them.

Described first is the functional configuration of the storage device 10. The blockage monitoring unit 101 monitors whether the communication path between the primary storage and the secondary storage is blocked (in an abnormal state). The abnormal state of the communication path described herein indicates disconnection of communication caused by a communication failure such as a case in which no normal response can be obtained. There are two types of factors that cause the abnormality in the communication path. One is with regard to hardware such as physical disconnection of wiring, and the other one is with regard to software such as a hang-up of a communication application. When a communication failure occurs such as a case in which no normal response can be obtained, the blockage monitoring unit 101 determines that the communication path is blocked whichever factor it is.

Figure 9:
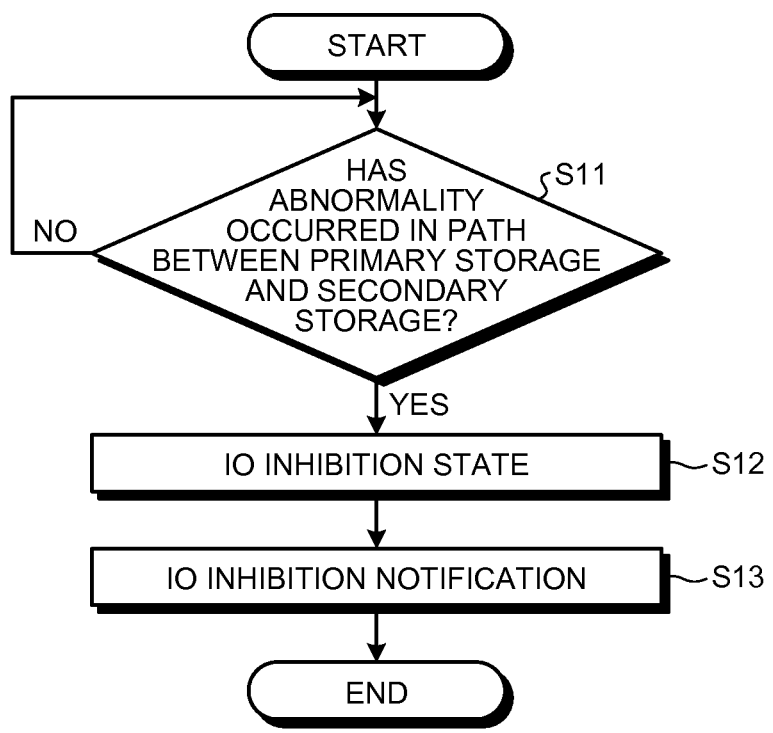
FIG. 9 is a flowchart illustrating the processing of a blockage monitoring unit.

FIG. 9 is a flowchart illustrating the processing of the blockage monitoring unit 101. As illustrated in FIG. 9, when the processing is started, the blockage monitoring unit 101 determines whether abnormality has occurred in the communication path between the primary storage and the secondary storage, that is, between the storage devices 10 and 20 (S11). Specifically, when the blockage monitoring unit 101 does not receive any normal response to, for example, acknowledgement (ACK), it determines that abnormality has occurred in the communication path.

If not (No at S11), the blockage monitoring unit 101 remains on standby in the processing. If abnormality has occurred in the communication path (Yes at S11), the blockage monitoring unit 101 causes the storage device 10 to be in an inhibition state in which input and output (IO) of data between the business server 40 and the storage device 10 is inhibited (S12), and transmits IO inhibition notification to the storage device 20 via the monitoring server 30 (S13). Specifically, the blockage monitoring unit 101 transmits, to the monitoring server 30, a response including the IO inhibition notification to the polling from the monitoring server 30. The blockage monitoring unit 101 requests the inhibition notification monitoring unit 102 to limit the time for monitoring the response to the IO inhibition notification to a certain time period (for example, nine seconds) to cause a timeout.

Figure 10:
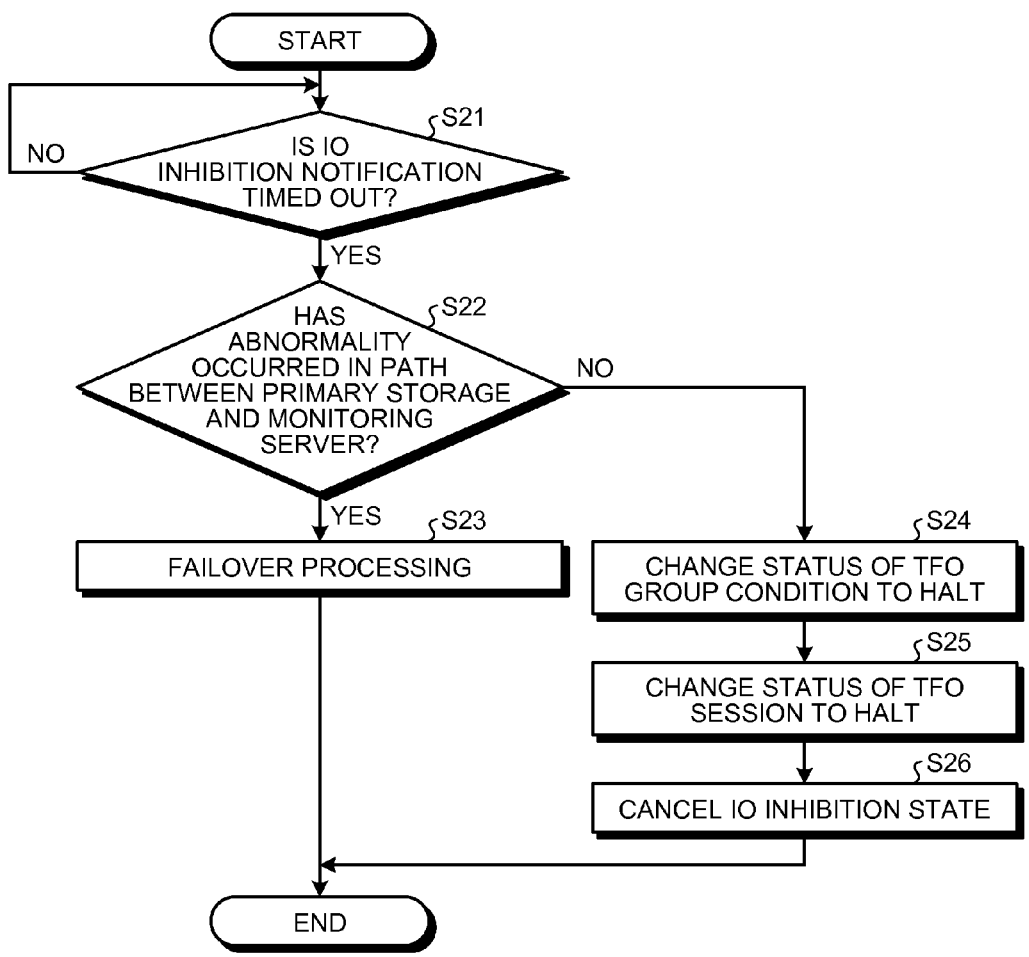
FIG. 10 is a flowchart illustrating the processing of an inhibition notification monitoring unit.

The inhibition notification monitoring unit 102 monitors whether a response to the IO inhibition notification transmitted by the blockage monitoring unit 101 is received. FIG. 10 is a flowchart illustrating the processing of the inhibition notification monitoring unit 102.

As illustrated in FIG. 10, when the processing is started on, for example, a request from the blockage monitoring unit 101, the inhibition notification monitoring unit 102 determines whether a timeout has occurred because any response to the IO inhibition notification was not received in a certain time period (for example, nine seconds) (S21). If not (No at S21), the inhibition notification monitoring unit 102 remains on standby in the processing. If a timeout has occurred, the inhibition notification monitoring unit 102 performs the processing at S22.

The inhibition notification monitoring unit 102 determines whether abnormality has occurred in the communication path between the storage device 10 as the primary storage and the monitoring server 30 (S22). Specifically, when a normal response to ACK is not received from the monitoring server 30, or the polling from the monitoring server 30 fails, the inhibition notification monitoring unit 102 determines that abnormality has occurred in the communication path.

If abnormality has occurred in the communication path (Yes at S22), the inhibition notification monitoring unit 102 requests the failover processing unit 103 to perform failover processing (S23). Accordingly, when abnormality has occurred in the communication path between the storage devices 10 and 20, and abnormality has occurred in the communication path between the storage device 10 and the monitoring server 30, which means that abnormality has occurred in the storage device 10, the failover processing unit 103 starts failover processing.

If abnormality has not occurred (No at S22), the inhibition notification monitoring unit 102 changes the status of "TFO group condition" in the management information T1 to "halt" (S24). By this processing, the inhibition notification monitoring unit 102 brings the condition of the TFO group to a halt. The inhibition notification monitoring unit 102 changes the status of the TFO session to a halt (S25), and cancels the IO inhibition state (S26). Accordingly, when abnormality has occurred in the communication path between the storage devices 10 and 20, but abnormality has not occurred in the communication path between the storage device 10 and the monitoring server 30, which means that abnormality has not occurred in the storage device 10, the inhibition notification monitoring unit 102 does not request switching (failover) to the storage device 20.

Figure 11:
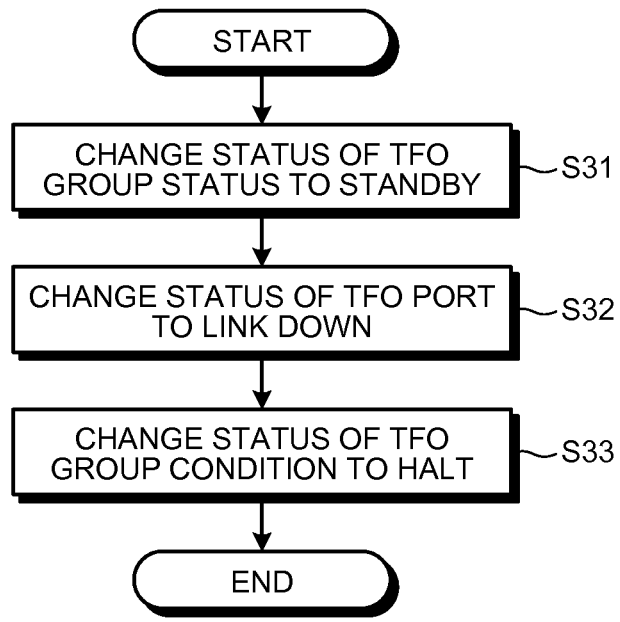
FIG. 11 is a flowchart illustrating the processing of a failover processing unit.

The failover processing unit 103 performs failover processing that links down the communication ports of the storage device 10 that communicate with the business server 40 to perform failover from the storage device 10 to the storage device 20. FIG. 11 is a flowchart illustrating the processing of the failover processing unit 103.

As illustrated in FIG. 11, when the failover processing is started in the storage device 10, the failover processing unit 103 changes the status of "TFO group status" to "standby" (S31). By this processing, the failover processing unit 103 brings the status of the TFO group to standby. Subsequently, the failover processing unit 103 changes the status of "TFO port link", that is, the communication ports of the storage device 10 that communicate with the business server 40, to "down" (inactivated) (S32). As a result of this processing, the business server 40 is not able to recognize the storage device 10, and is thus not able to communicate with the storage device 10. The failover processing unit 103 then changes the status of "TFO group condition" to "halt" (S33).

Figure 12:
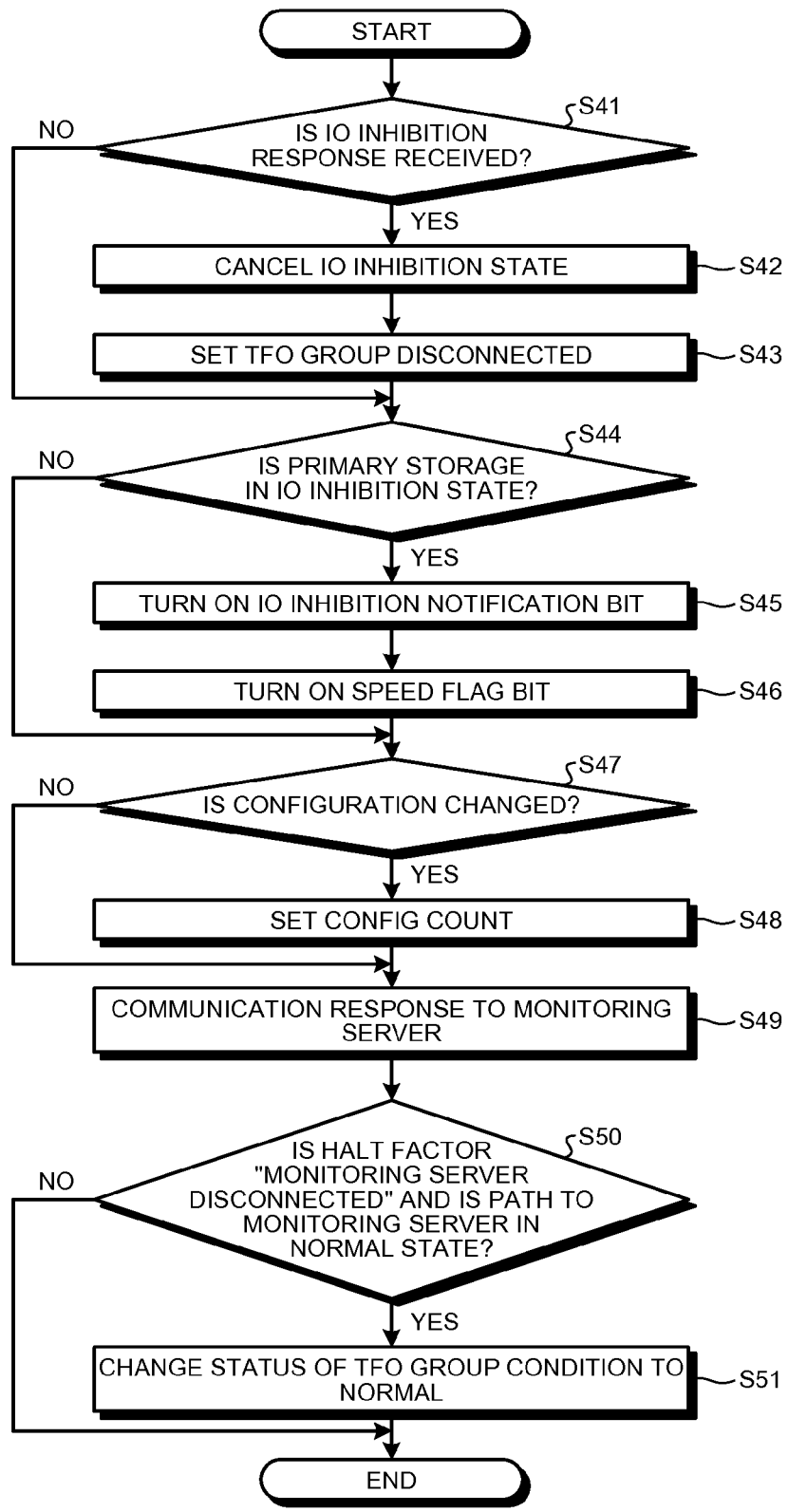
FIG. 12 is a flowchart illustrating the processing of a communication processing unit.

The communication processing unit 104 controls communication between the storage device 10 and the monitoring server 30. FIG. 12 is a flowchart illustrating the processing of the communication processing unit 104. As illustrated in FIG. 12, the communication processing unit 104 determines whether it has received a response to the IO inhibition notification on the basis of the transmission information I transmitted at the polling from the monitoring server 30 (S41).

If not (No at S41), the communication processing unit 104 performs the processing at S44. If the communication processing unit 104 has received a response to the IO inhibition notification (Yes at S41), it cancels the IO inhibition state (S42). The communication processing unit 104 then sets "TFO group condition halt factor" to "TFO group disconnected", for the IO inhibition notification was transmitted because of the blockage of the communication path between the primary storage and the secondary storage (S43).

The communication processing unit 104 determines whether the storage device 10 is in the IO inhibition state by referring to the management information T1 (S44). If not (No at S44), the communication processing unit 104 performs the processing at S47. If the storage device 10 is in the IO inhibition state (Yes at S44), the communication processing unit 104 turns on the bit of the transmission information I for transmitting the IO inhibition notification (S45) and turns on the bit of "speed flag" (S46).

The communication processing unit 104 determines whether there is any change in the configuration of the storage devices 10 and 20 in comparison to the most recent configuration by referring to the management information T1 (S47). If not (No at S47), the communication processing unit 104 performs the processing at S49. If there is any change in configuration (Yes at S47), the communication processing unit 104 increments and sets the counter value of "config count" (S48).

The communication processing unit 104 transmits the transmission information I that has been set in the processing from S41 to S48 to the monitoring server 30 as a communication response to the polling from the monitoring server 30 (S49). The communication processing unit 104 determines whether the status of "TFO group condition halt factor" in the management information T1 is "monitoring server disconnected" and determines whether the path to the monitoring server 30 is in a normal state (S50). Whether the path to the monitoring server 30 is in a normal state is determined on the basis of, for example, whether the polling from the monitoring server 30 is received.

If the determination result is positive at S50 (Yes at S50), which means that the condition of the path to the monitoring server 30 returns to normal, the communication processing unit 104 changes the status of "TFO group condition" in the management information T1 to "normal" (S51). If the determination result is negative at S50 (No at S50), the communication processing unit 104 skips the processing at S51 and ends the processing.

Figure 13:
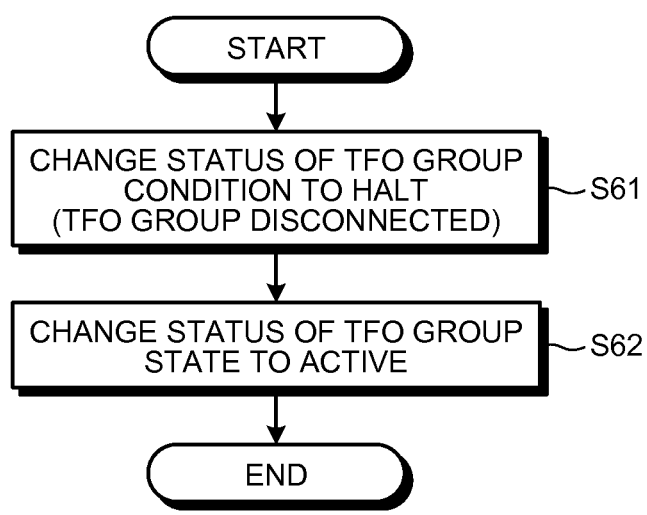
FIG. 13 is a flowchart illustrating the processing of a build processing unit.

The build processing unit 105 performs build processing in the storage device 10 when any change in the configuration of the TFO group is indicated in "config count" in the transmission information I. FIG. 13 is a flowchart illustrating the processing of the build processing unit 105.

As illustrated in FIG. 13, when the processing is started, the build processing unit 105 changes the status of "TFO group condition" in the management information T1 to "halt" (S61). Assume that the status of "TFO group condition halt factor", which is the halt factor of the TFO group, is "TFO group disconnected". The build processing unit 105 changes the status of "TFO group status" in the management information T1 to "active" (S62).

Described next is the functional configuration of the monitoring server 30. The transmission and reception processing unit 301 transmits and receives information to and from the storage devices 10 and 20. Specifically, the transmission and reception processing unit 301 polls the storage devices 10 and 20 at certain intervals, receives information from the storage devices 10 and 20 at the polling, and transmits the received information to the storage devices 10 and 20 at the next polling.

Figure 14:
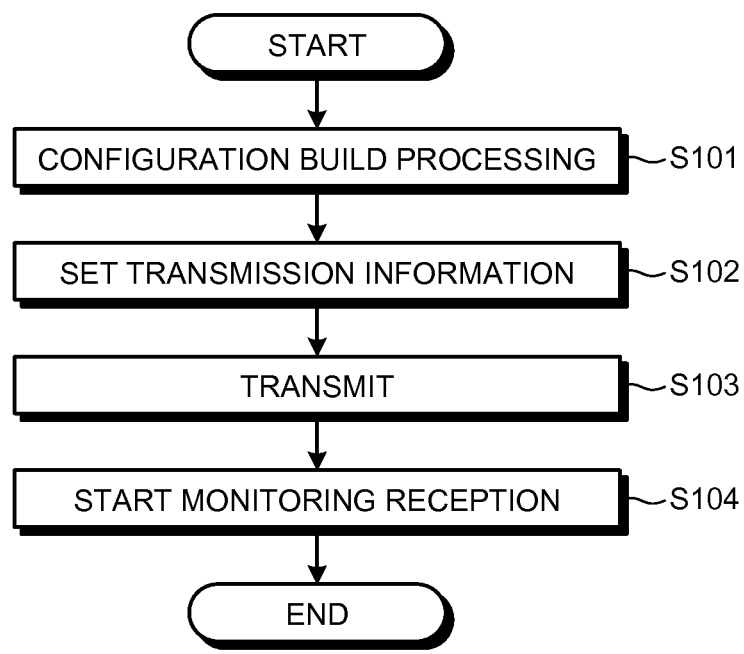
FIG. 14 is a flowchart illustrating the initial processing of a transmission and reception processing unit.

FIG. 14 is a flowchart illustrating the initial processing of the transmission and reception processing unit 301. The initial processing is the processing that is performed when the transmission and reception processing unit 301 transmits and receives information to and from the storage devices 10 and 20 for the first time. As illustrated in FIG. 14, when the initial processing is started, the transmission and reception processing unit 301 performs configuration build processing in which the transmission and reception processing unit 301 sets a flag indicating that, for example, the configuration is being changed in the transmission information I and polls the storage devices 10 and 20 to receive responses from the storage devices 10 and 20 with regard to the configuration thereof (S101). The transmission and reception processing unit 301 sets the transmission information I on the basis of the responses received from the storage devices 10 and 20 with regard to the configuration (S102), and transmits (polls) the transmission information I to the storage devices 10 and 20 (S103). By this processing, the storage devices 10 and 20 can share information on the configuration with each other. The transmission and reception processing unit 301 starts monitoring the reception of responses from the storage devices 10 and 20 (S104).

Figure 15:
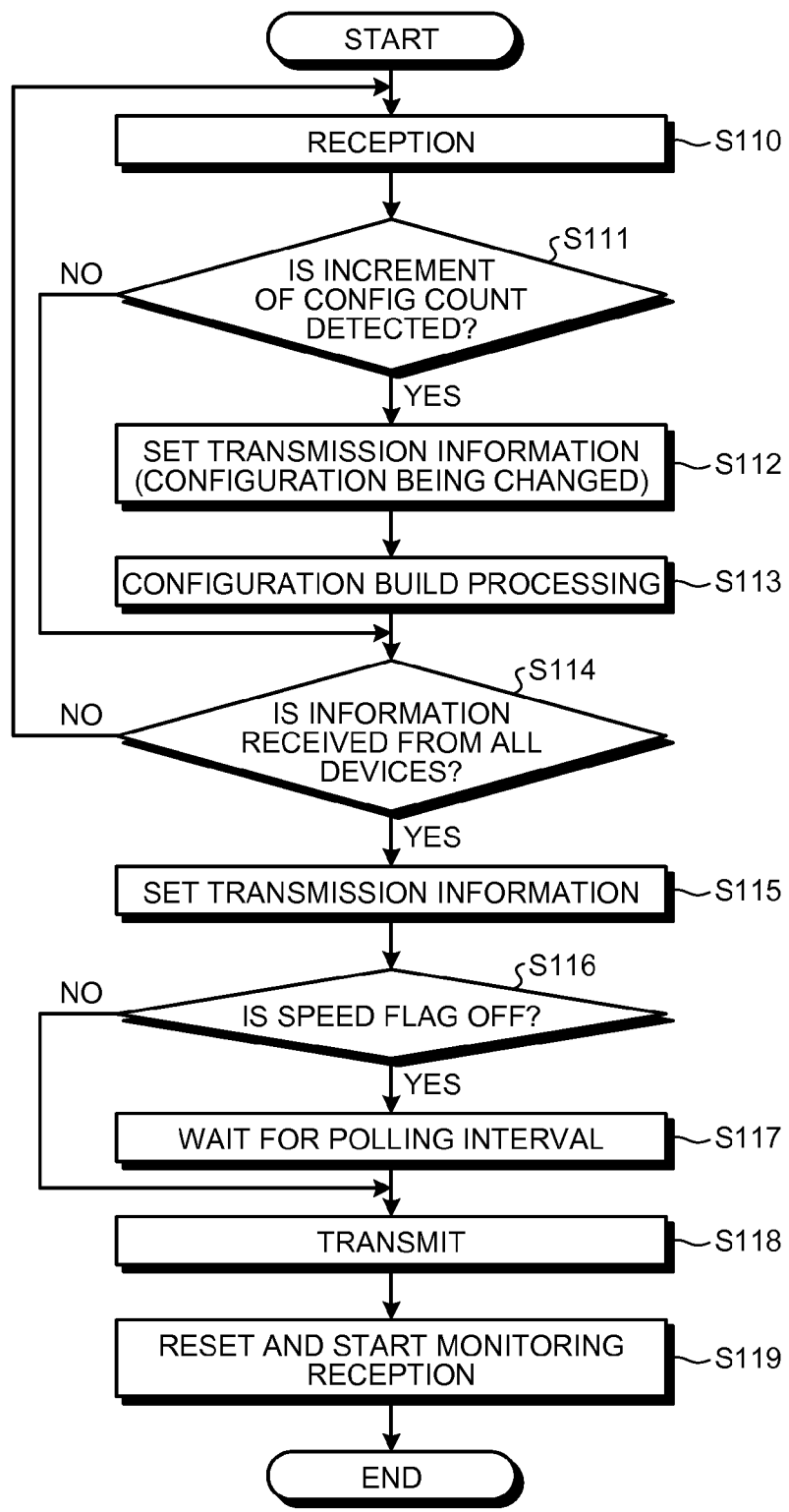
FIG. 15 is a flowchart illustrating the processing of the transmission and reception processing unit.

FIG. 15 is a flowchart illustrating the processing of the transmission and reception processing unit 301, and specifically illustrating the processing of the transmission and reception processing unit 301 performed after the initial processing thereof.

As illustrated in FIG. 15, the transmission and reception processing unit 301 receives the transmission information I from the storage devices 10 and 20 (S110), and determines whether an increment of "config count" is detected (S111). If not (No at S111), the transmission and reception processing unit 301 performs the processing at S114.

If an increment of "config count" is detected (Yes at S111), the transmission and reception processing unit 301 sets a flag indicating that, for example, the configuration is being changed and sets the transmission information I (S112), and performs the configuration build processing in which responses are acquired from the storage devices 10 and 20 with regard to the configuration thereof by polling the storage devices 10 and 20 (S113).

The transmission and reception processing unit 301 determines whether it has received responses from all the devices of the TFO group, that is, from the storage devices 10 and 20 (S114). If not (No at S114), the processing is returned to S110 and the transmission and reception processing unit 301 waits for the responses.

If the transmission and reception processing unit 301 has received the responses from the storage devices 10 and 20 (Yes at S114), it sets the transmission information I on the basis of the responses received from the storage devices 10 and 20 with regard to the configuration thereof (S115). The transmission and reception processing unit 301 determines whether "speed flag" of the transmission information I is off (S116).

If "speed flag" is off (Yes at S116), which means that the polling interval need not be shortened, the transmission and reception processing unit 301 waits for the next polling for a certain time period set in advance (S117). If not (No at S116), which means that the polling interval need be shortened, the transmission and reception processing unit 301 skips the processing at S117 at which it waits for the next polling for a certain time period.

The transmission and reception processing unit 301 transmits (polls) the transmission information I set at S115 to the storage devices 10 and 20 (S118), and resets and starts the monitoring of the reception of responses (S119).

The timeout processing unit 302 monitors whether a timeout has occurred in which no response is received within a certain time period after the transmission and reception processing unit 301 polls the storage devices 10 and 20. If a timeout has occurred, the timeout processing unit 302 transmits information indicating the timeout to the storage devices 10 and 20.

Figure 16:
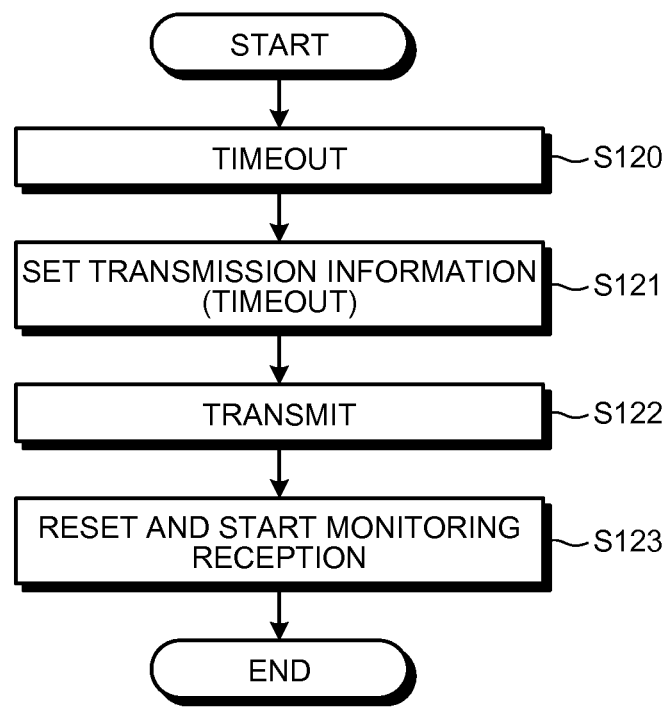
FIG. 16 is a flowchart illustrating the processing of a timeout processing unit.

FIG. 16 is a flowchart illustrating the processing of the timeout processing unit 302. As illustrated in FIG. 16, if a timeout has occurred in which no response is received within a certain time period after the polling to the storage devices 10 and 20 (S120), the timeout processing unit 302 sets the transmission information I indicating that the polling failed because of the timeout (S121). The timeout processing unit 302 transmits the set transmission information I to the storage devices 10 and 20 (S122) and resets and starts the monitoring of the reception of responses (S123).

Described next is the functional configuration of the storage device 20. The blockage monitoring unit 201 monitors whether the communication path between the primary storage and the secondary storage is blocked (in an abnormal state).

Figure 17:
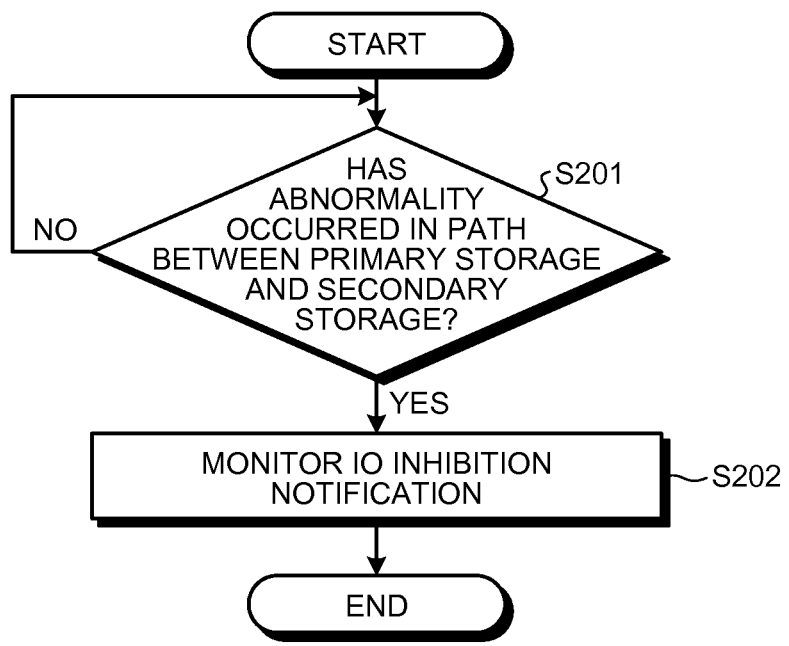
FIG. 17 is a flowchart illustrating the processing of a blockage monitoring unit.

FIG. 17 is a flowchart illustrating the processing of the blockage monitoring unit 201. As illustrated in FIG. 17, when the processing is started, the blockage monitoring unit 201 determines whether abnormality has occurred in the communication path between the primary storage and the secondary storage, that is, between the storage devices 10 and 20 (S201). Specifically, when the blockage monitoring unit 201 does not receive any normal response to, for example, ACK, it determines that abnormality has occurred in the communication path.

If not (No at S201), the blockage monitoring unit 201 remains on standby in the processing. If abnormality has occurred in the communication path (Yes at S201), the blockage monitoring unit 201 requests the inhibition notification monitoring unit 202 to limit the time for monitoring the IO inhibition notification to a certain time period (for example, 15 seconds) to cause a timeout.

Figure 18:
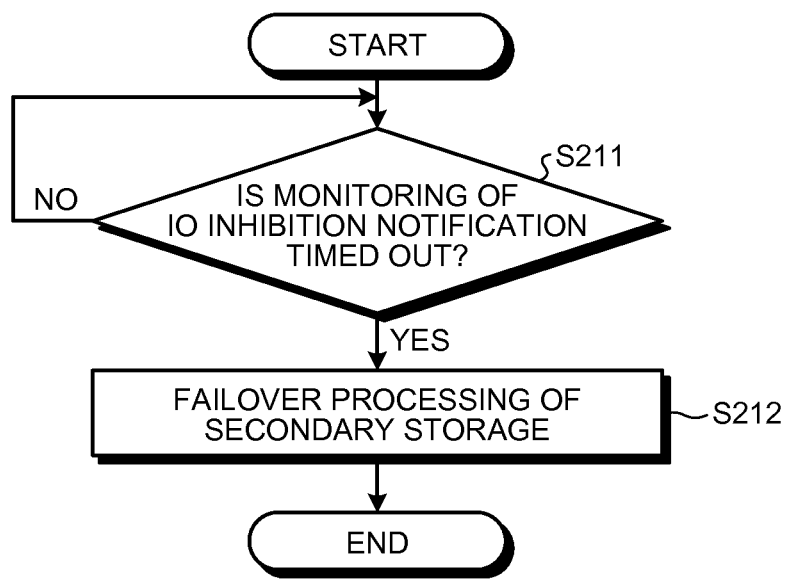
FIG. 18 is a flowchart illustrating the processing of an inhibition notification monitoring unit.

The inhibition notification monitoring unit 202 monitors whether the IO inhibition notification is received from the storage device 10 via the monitoring server 30. FIG. 18 is a flowchart illustrating the processing of the inhibition notification monitoring unit 202.

As illustrated in FIG. 18, when the processing is started on, for example, a request from the blockage monitoring unit 201, the inhibition notification monitoring unit 202 determines whether a timeout has occurred because the IO inhibition notification was not received in a certain time period (for example, 15 seconds) (S211). If not (No at S211), the inhibition notification monitoring unit 202 remains on standby in the processing.

If a timeout has occurred (Yes at S211), the inhibition notification monitoring unit 202 requests the failover processing unit 203 to perform failover processing (S212). Accordingly, when abnormality has occurred in the communication path between the storage devices 10 and 20, the storage device 20 has not received the IO inhibition notification from the storage device 10, and abnormality has occurred in the communication path between the storage device 10 and the monitoring server 30, which means that abnormality has occurred in the storage device 10, the failover processing unit 203 starts failover processing.

Figure 19:
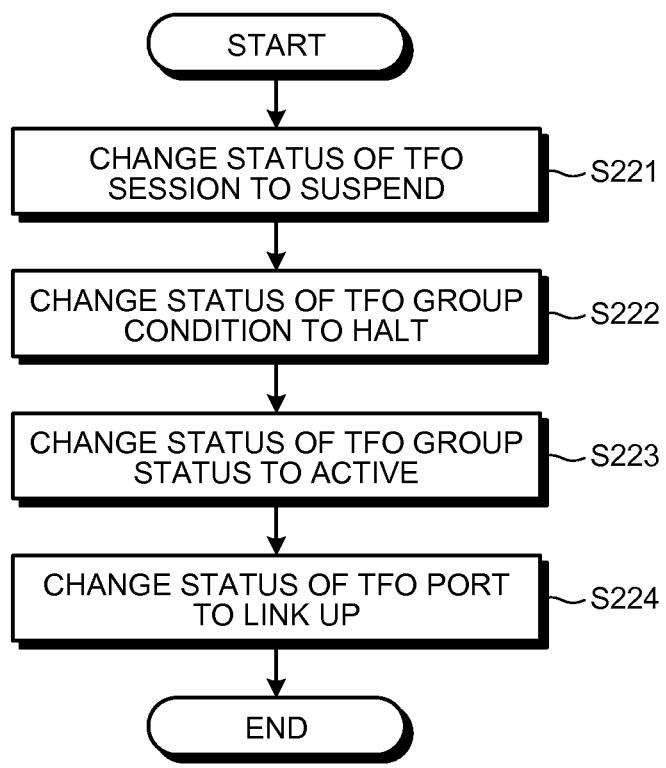
FIG. 19 is a flowchart illustrating the processing of a failover processing unit.

The failover processing unit 203 performs failover processing that links up the communication ports of the storage device 20 that communicate with the business server 40 to perform failover from the storage device 10 to the storage device 20. FIG. 19 is a flowchart illustrating the processing of the failover processing unit 203.

As illustrated in FIG. 19, when the failover processing is started in the storage device 20, the failover processing unit 203 changes the status of "TFO session" to "suspend" (S221). The failover processing unit 203 changes the status of "TFO group condition" to "halt" (S222), and changes the status of "TFO group status" to "active" (S223). The failover processing unit 203 then changes the status of "TFO port link", that is, the communication ports of the storage device 20 that communicate with the business server 40, to "up" (activated) (S224).

This processing causes the business server 40 to recognize the storage device 20 and to start communicating with the storage device 20. This processing also switches the storage device 10 to the storage device 20 transparently, so that the business server 40 inputs and outputs data to and from the storage device 20 without setting, for example, the WWN. Consequently, the storage system 1 can ensure continuity of input and output of data between the host server and the storage, that is, between the business server 40 and the storage devices 10 and 20.

Figure 20:
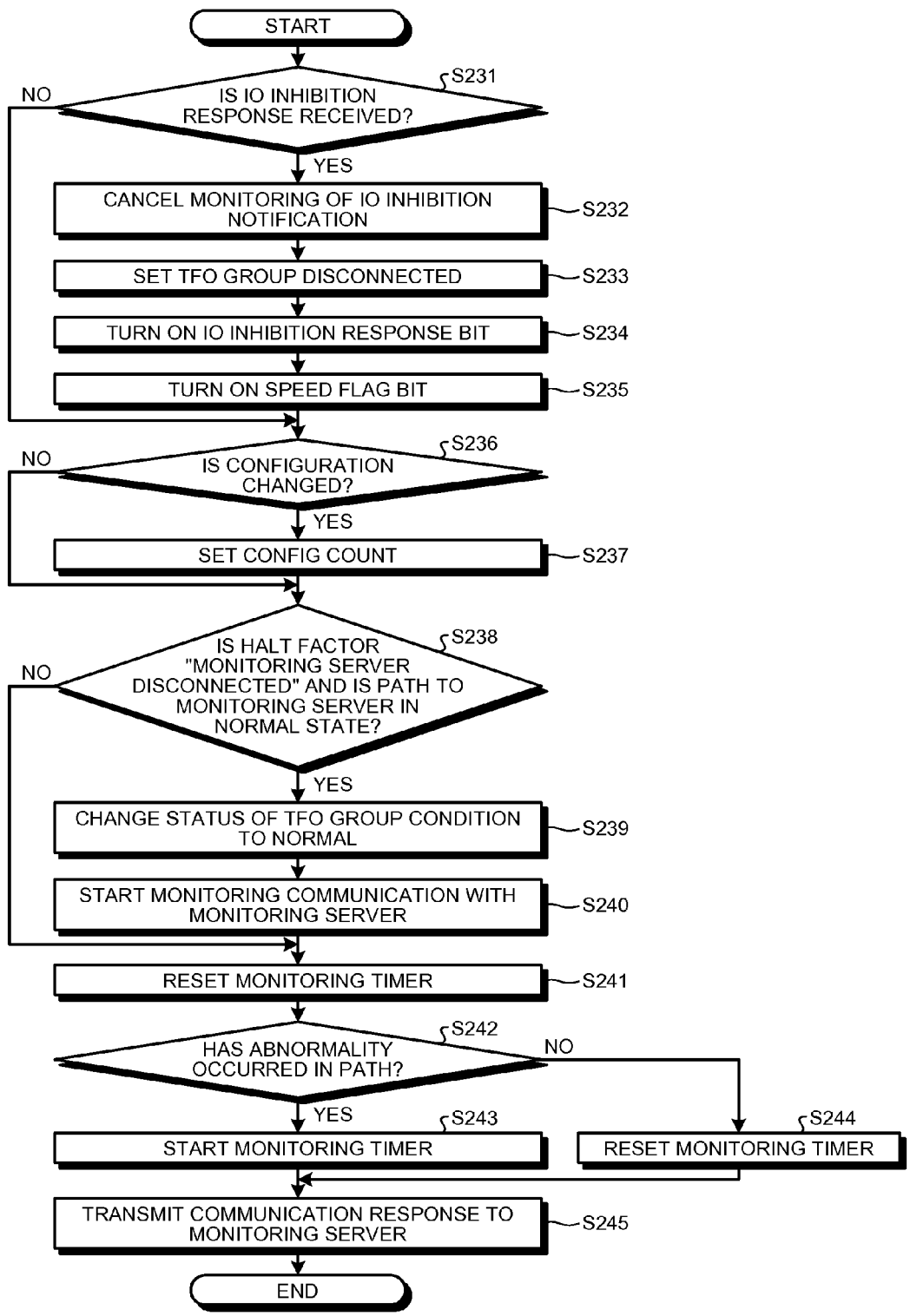
FIG. 20 is a flowchart illustrating the processing of a communication processing unit.

The communication processing unit 204 controls communication between the storage device 20 and the monitoring server 30. FIG. 20 is a flowchart illustrating the processing of the communication processing unit 204. As illustrated in FIG. 20, the communication processing unit 204 determines whether it has received the IO inhibition notification on the basis of the transmission information I transmitted at the polling from the monitoring server 30 (S231).

If not (No at S231), the communication processing unit 204 performs the processing at S236. If the communication processing unit 204 has received the IO inhibition notification (Yes at S231), it cancels the monitoring of the IO inhibition notification (S232). The communication processing unit 204 then sets "TFO group condition halt factor" to "TFO group disconnected", for the IO inhibition notification was transmitted because of the blockage of the communication path between the primary storage and the secondary storage (S233).

The communication processing unit 204 turns on the bit of the transmission information I for responding to the IO inhibition notification (S234), and turns on the bit of "speed flag" (S235).

The communication processing unit 204 determines whether there is any change in the configuration of the storage devices 10 and 20 in comparison to the most recent configuration by referring to the management information T1 (S236). If not (No at S236), the communication processing unit 204 performs the processing at S238. If there is any change in configuration (Yes at S236), the communication processing unit 204 increments and sets the counter value of "config count" (S237). The communication processing unit 204 transmits the transmission information I that has been set in the processing from S231 to S237 to the monitoring server 30 as a communication response to the polling from the monitoring server 30.

The communication processing unit 204 determines whether the status of "TFO group condition halt factor" in the management information T1 is "monitoring server disconnected" and determines whether the path to the monitoring server 30 is in a normal state (S238). Whether the path to the monitoring server 30 is in a normal state is determined on the basis of, for example, whether the polling from the monitoring server 30 is received.

If the determination result is positive at S238 (Yes at S238), which means that the condition of the path to the monitoring server 30 returns to normal, the communication processing unit 204 changes the status of "TFO group condition" in the management information T1 to "normal" (S239). The communication processing unit 204 then starts monitoring the communication with the monitoring server 30 (S240), and resets a monitoring timer (S241).

The communication processing unit 204 determines whether abnormality has occurred in the communication path between the storage device 20 and the monitoring server 30 on the basis of the monitoring of the communication with the monitoring server 30 (S242). If abnormality has occurred (Yes at S242), the communication processing unit 204 starts the monitoring timer (S243). If not (No at S242), the communication processing unit 204 resets the monitoring timer (S244). After performing the processing at S243 and S244, the communication processing unit 204 transmits, to the monitoring server 30, a communication response to the polling (S245).

Figure 21:
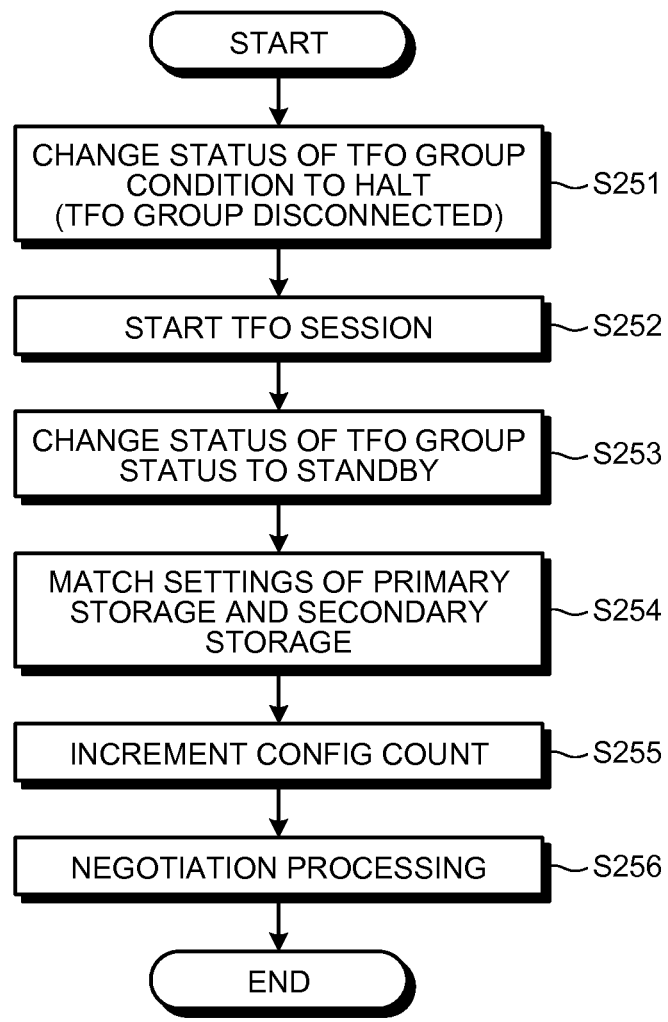
FIG. 21 is a flowchart illustrating the processing of a build processing unit.

The build processing unit 205 performs build processing in the storage device 20 when any change in the configuration of the TFO group is indicated in "config count" in the transmission information I. FIG. 21 is a flowchart illustrating the processing of the build processing unit 205.

As illustrated in FIG. 21, when the processing is started, the build processing unit 205 changes the status of "TFO group condition" in the management information T1 to "halt" (S251). Assume that the status of "TFO group condition halt factor", which is the halt factor of the TFO group, is "TFO group disconnected". The build processing unit 205 starts the TFO session (S252), and changes the status of "TFO group status" in the management information T1 to "standby" (S253).

The build processing unit 205 matches the setting of the secondary storage with the setting of the primary storage on the basis of the transmission information I transmitted from the storage device 10 via the monitoring server 30 (S254). Specifically, the build processing unit 205 copies the setting of the storage device 10 as the primary storage and sets it in the management information T1. At this time, the build processing unit 205 sets, for example, the same WWPNs as those set in the storage device 10 for the communication ports of the storage device 20 that communicate with the business server 40.

The build processing unit 205 increments "config count" in the transmission information I (S255), and requests the negotiation processing unit 207 to start negotiation processing (S256).

Figure 22:
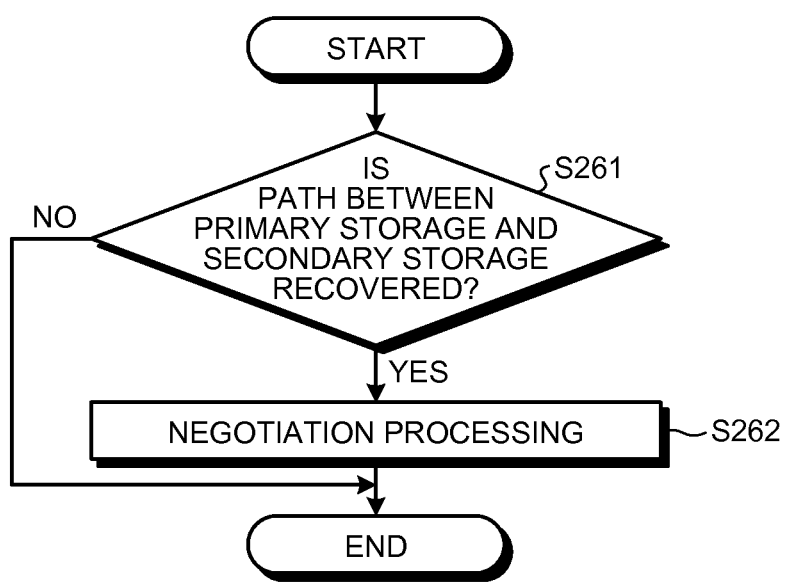
FIG. 22 is a flowchart illustrating the processing of a recovery monitoring unit.

The recovery monitoring unit 206 monitors whether the communication path between the storage devices 10 and 20 recovers from abnormality. Specifically, when abnormality is detected in the communication path between the storage devices 10 and 20, the recovery monitoring unit 206 checks whether the communication path has recovered from abnormality at certain intervals. FIG. 22 is a flowchart illustrating the processing of the recovery monitoring unit 206.

As illustrated in FIG. 22, when the processing is started, the recovery monitoring unit 206 determines whether the communication path between the primary storage and the secondary storage, that is, between the storage devices 10 and 20, has recovered from abnormality (S261). Specifically, when the storage device 20 receives a normal response to, for example, ACK, the recovery monitoring unit 206 determines that the communication path has recovered from abnormality. If the communication path has recovered from abnormality (Yes at S261), the recovery monitoring unit 206 requests the negotiation processing unit 207 to start negotiation processing (S262). If not (No at S261), the recovery monitoring unit 206 skips the processing at S262 and ends the processing.

The negotiation processing unit 207 performs negotiation between the storage devices 10 and 20. Specifically, when the secondary storage is "active", that is, the storage device 20 is communicating with the business server 40, the negotiation processing unit 207 copies the data of the storage device 20 to the storage device 10 by communicating with the storage device 10. When the secondary storage is not active, that is, the storage device 20 is not communicating with the business server 40, the negotiation processing unit 207 matches the setting of the storage device 20 with the setting of the storage device 10 with respect to the condition of the TFO group by communicating with the storage device 10.

Figure 23:
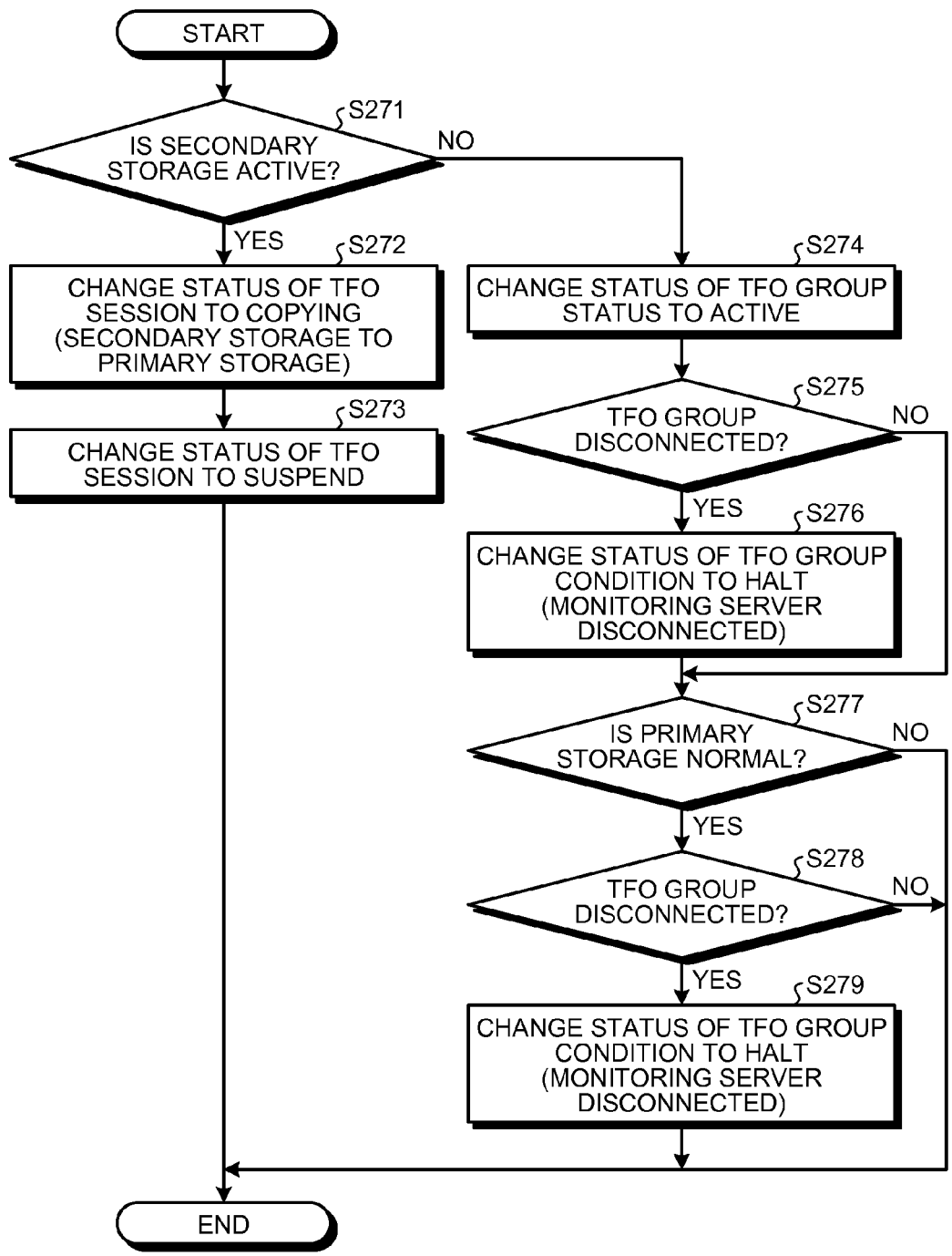
FIG. 23 is a flowchart illustrating the processing of a negotiation processing unit.

FIG. 23 is a flowchart illustrating the processing of the negotiation processing unit 207. As illustrated in FIG. 23, the negotiation processing unit 207 determines whether the secondary storage is "active" by referring to the management information T1 (S271). If the secondary storage is "active" (Yes at S271), the negotiation processing unit 207 changes the status of "TFO session" to "copying" (S272). By this processing, the secondary storage starts copying the own data to the primary storage and the data is backed up by the primary storage. The negotiation processing unit 207 changes the status of "TFO session" to "suspend" (S273).

If the secondary storage is not "active" (No at S271), the negotiation processing unit 207 changes the status of "TFO group status" in the management information T1 to "active" (S274). The negotiation processing unit 207 determines whether the status of "TFO group condition halt factor" of the primary storage in the management information T1 is "TFO group disconnected" (S275).

If the determination result at S275 is positive (Yes at S275), the negotiation processing unit 207 changes the status of "TFO group condition" of the primary storage in the management information T1 to "halt" (S276). Assume that the status of "TFO group condition halt factor", which is the halt factor of the primary storage, is "monitoring server disconnected". If the determination result at S275 is negative (No at S275), the negotiation processing unit 207 skips the processing at S276 and performs the processing at S277.

The negotiation processing unit 207 determines whether the storage device 10 as the primary storage is "normal" on the basis of the management information T1 (S277). If not (No at S277), the negotiation processing unit 207 skips the processing at S278 and S279 and ends the processing.

If the determination result at S277 is positive (Yes at S277), the negotiation processing unit 207 determines whether the status of "TFO group condition halt factor" of the secondary storage is "TFO group disconnected" on the basis of the management information T1 (S278). If not (No at S278), the negotiation processing unit 207 skips the processing at S279 and ends the processing.

If the determination result at S278 is positive (Yes at S278), the negotiation processing unit 207 changes the status of "TFO group condition" of the secondary storage in the management information T1 to "halt" (S279). Assume that the status of "TFO group condition halt factor", which is the halt factor of the secondary storage, is "monitoring server disconnected".

Figure 24:
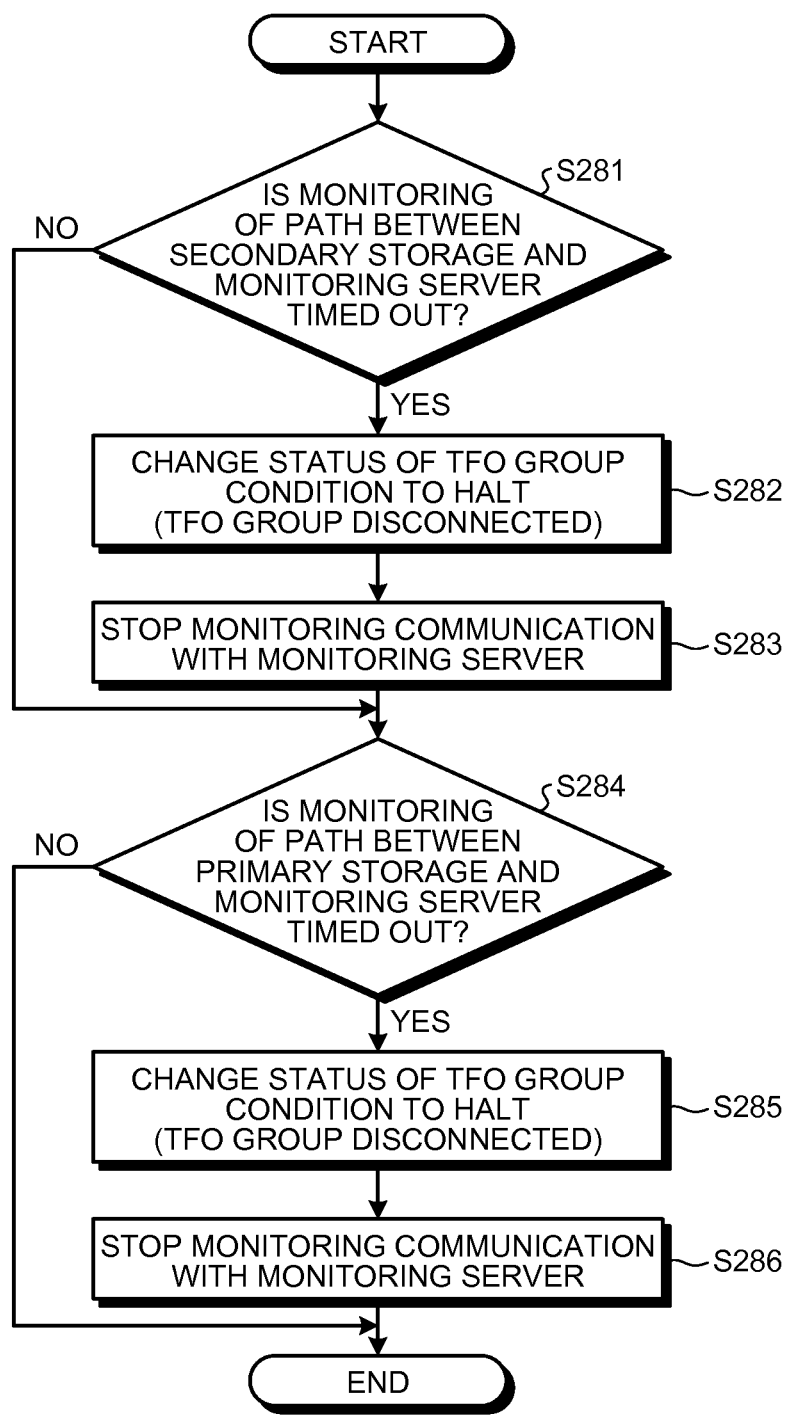
FIG. 24 is a flowchart illustrating the processing of a communication monitoring processing unit.

The communication monitoring processing unit 208 monitors the communication between the storage device 20 and the monitoring server 30. FIG. 24 is a flowchart illustrating the processing of the communication monitoring processing unit 208. As illustrated in FIG. 24, the communication monitoring processing unit 208 determines whether a timeout has occurred in a certain time period (for example, three seconds) in monitoring the path between the storage deice 20 as the secondary storage and the monitoring server 30 (S281). If not (No at S281), the communication monitoring processing unit 208 performs the processing at S284.

If a timeout has occurred (Yes at S281), the communication monitoring processing unit 208 changes the status of "TFO group condition" of the secondary storage in the management information T1 to "halt" (S282). Assume that the status of "TFO group condition halt factor", which is the halt factor of secondary storage, is "TFO group disconnected". The communication monitoring processing unit 208 stops monitoring the communication between the storage device 20 and the monitoring server 30 (S283).

The communication monitoring processing unit 208 determines whether a timeout has occurred in a certain time period (for example, 30 seconds) in monitoring the path between the storage device 10 as the primary storage and the monitoring server 30 (S284). If not (No at S284), the communication monitoring processing unit 208 ends the processing.

If a timeout has occurred (Yes at S284), the communication monitoring processing unit 208 changes the status of "TFO group condition" of the secondary storage in the management information T1 to "halt" (S285). Assume that the status of "TFO group condition halt factor", which is the halt factor of the secondary storage, is "TFO group disconnected". The communication monitoring processing unit 208 stops monitoring the communication between the storage device 20 and the monitoring server 30 (S286).

As described above, the monitoring server 30 polls the storage devices 10 and 20 at certain intervals, receives information from the storage devices 10 and 20 at the polling, and transmits the received information to the storage devices 10 and 20 at the next polling. With this configuration, the storage devices 10 and 20 can share information with each other, and can perform failover processing. In the storage devices 10 and 20, the same WWPNs are set to the CAs 11a, 11b, 12a, and 12b and the corresponding CAs 21a, 21b, 22a, and 22b that communicate with the business server 40. Moreover, for example, the same WWNN, the same UIDs for volumes, and the same HLUN are set in the storage devices 10 and 20.

The communication ports of one of the storage devices 10 and 20 are linked up (activated) and the communication ports of the other one are linked down (inactivated). For example, when the storage device 10 has no failure and operates normally, the communication ports of the storage device 10 are linked up and the communication ports of the storage device 20 are linked down. With this configuration, the business server 40 uses the storage device 10 to input and output data in a normal operation. When any failure occurs in the storage device 10, the communication ports of the storage device 10 are linked down and the communication ports of the storage device 20 are linked up. With this configuration, the storage device 10 is transparently switched to the storage device 20, so that the business server 40 inputs and outputs data to and from the storage device 20, thereby ensuring continuity of input and output of data between the business server 40 and the storage device 10 or 20.

It is Preferable to set a longer timeout period for the secondary storage to receive (respond to) the IO inhibition notification than the primary storage for starting the failover processing in the storage devices 10 and 20. By setting a longer timeout period for the secondary storage, the secondary storage starts the failover processing later than the primary storage. With this configuration, after the communication ports of the primary storage are linked down, the communication ports of the secondary storage can be linked up.

Preferably, the timeout periods for the primary storage and the secondary storage are set to such a value that the business server 40 can continue to input and output data to and from the storage devices 10 and 20 without causing errors. Assume that, for example, a 25-second-halt in inputting and outputting data between the business server 40 and the storage devices 10 and 20 causes an error, and an operation suspension period occurs. In this assumption, if the sum of the timeout periods for starting the failover processing in the storage devices 10 and 20 is set to less than 25 seconds (for example, 9 seconds and 15 seconds), the storage devices 10 and 20 can start the failover processing before an error occurs. Accordingly, the business suspension period can be prevented from occurring.

According to an aspect of the embodiment, continuity of input and output of data between a host server and a storage device can be ensured.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system comprising:
   a first storage device that includes an active storage unit and a communication port communicating with a host server;
   a second storage device that includes a standby storage unit and a communication port communicating with the host server; and
   a monitoring server,
   the first storage device, the second storage device, and the monitoring server being communicably connected with each other,
   the communication port of the first storage device and the communication port of the second storage device having a same identifier,
   the host server communicating with, based on the identifier, one of the first storage device and the second storage device with the communication port being activated, wherein
   the monitoring server includes a transmission and reception unit that receives information from the first storage device and the second storage device by performing polling to the first storage device and the second storage device at a certain interval, and transmits the received information to the first storage device and the second storage device at next polling,
   the first storage device includes a first failover processing unit that inactivates the communication port of the first storage device when the first failover processing unit determines that abnormality has occurred in a communication path between the first storage device and the second storage device and determines, based on the polling from the monitoring server, that abnormality has occurred in a communication path between the first storage device and the monitoring server, and
   the second storage device includes a second failover processing unit that activates the communication port of the second storage device when the second failover processing unit determines that abnormality has occurred in the communication path between the first storage device and the second storage device and determines, based on the polling from the monitoring server, that abnormality has occurred in the communication path between the first storage device and the monitoring server.

2. The storage system according to claim 1, wherein
   after abnormality has occurred in the communication path between the first storage device and the second storage device, the first failover processing unit determines whether abnormality has occurred in the communication path between the first storage device and the monitoring server by monitoring the polling from the monitoring server at a first interval, and
   after abnormality has occurred in the communication path between the first storage device and the second storage device, the second failover processing unit determines whether abnormality has occurred in the communication path between the first storage device and the monitoring server by monitoring the polling from the monitoring server at a second interval that is longer than the first interval.

3. The storage system according to claim 1, wherein the second storage device further includes a negotiation processing unit that negotiates with the first storage device and copies data of the standby storage unit to the active storage unit when the communication path between the first storage device and the second storage device is recovered and when the communication port of the second storage device is activated.

4. The storage system according to claim 1, wherein
   when abnormality has occurred in the communication path between the first storage device and the second storage device, the first storage device and the second storage device transmit, in response to the polling from the monitoring server, notification for shortening an interval for the polling, and
   the transmission and reception unit shortens the interval for the polling based on the notification for shortening the interval for the polling.

5. The storage system according to claim 1, wherein
   the first storage device and the second storage device transmit information indicating a change in configuration in response to the polling from the monitoring server, and
   when the transmission and reception unit receives the information indicating the change in the configuration, the transmission and reception unit collects information indicating the configuration from the first storage device and the second storage device, and transmits the collected information to the first storage device and the second storage device.

6. The storage system according to claim 1, wherein the second storage device further includes a build processing unit that sets the same identifier as that of the communication port of the first storage device for the communication port of the second storage device based on information on the first storage device transmitted at the polling.

7. A storage device that is communicably connected to another storage device and a monitoring server, the storage device comprising:
   at least one of an active storage unit and a standby storage unit;
   a communication port that has a same identifier as an identifier of a communication port of the another storage device, and communicates with a host server based on the identifier;
   a communication processing unit that transmits first information of the storage device in response to polling from the monitoring server and receives second information from the monitoring server, which is set on the basis of both of the transmitted first information and information of the another storage device transmitted from the another storage device in response to the polling from the monitoring server; and
   a failover processing unit that inactivates, in case that the communication port of the storage device having been activated, the activated communication port, when the failover processing unit determines, based on the received second information, that abnormality has occurred in a communication path between the another storage device and the storage device and determines, based on the polling from the monitoring server, that abnormality has occurred in a communication path between the storage device and the monitoring server, wherein the failover processing unit activates, in case that the communication port of the storage device having been inactivated, the inactivated communication port, when the failover processing unit determines, based on the received second information, that abnormality has occurred in the communication path between the another storage device and the storage device and determines, based on the polling from the monitoring server, that abnormality has occurred in a communication path between the another storage device and the monitoring server.

8. A monitoring server that is communicably connected to a first storage device including an active storage unit and a second storage device including a standby storage unit, the monitoring server comprising:

a transmission and reception unit that receives information indicating that abnormality has occurred in a communication path between the first storage device and the second storage device from the first storage device and the second storage device by performing polling to the first storage device and the second storage device at a certain interval, and transmits the received information to the first storage device in order to inactivate the communication port of the first storage device and to the second storage device in order to activate the communication port of the second storage device to the first storage device and the second storage device at next polling.

9. The monitoring server according to claim 8, wherein the transmission and reception unit notifies, when a timeout occurs in polling the first storage device or the second storage device, the another storage device of the timeout.

* * * * *